US011898258B2

(12) United States Patent
Korin et al.

(10) Patent No.: US 11,898,258 B2
(45) Date of Patent: Feb. 13, 2024

(54) ELECTROCHEMICAL OXIDATION OF METHANE TO METHANOL

(71) Applicant: B. G. NEGEV TECHNOLOGIES & APPLICATIONS LTD., AT BEN-GURION UNIVERSITY, Beer Sheva (IL)

(72) Inventors: Eliyaho Korin, Beer Sheva (IL); Armand Bettelheim, Beer Sheva (IL); Lior Frimet, Lehavim (IL); Amir Kaplan, Beer Sheva (IL); Yanir Kadosh, Beer Sheva (IL)

(73) Assignee: B. G. NEGEV TECHNOLOGIES & APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 657 days.

(21) Appl. No.: 17/054,669

(22) PCT Filed: May 19, 2019

(86) PCT No.: PCT/IL2019/050565
§ 371 (c)(1),
(2) Date: Nov. 11, 2020

(87) PCT Pub. No.: WO2019/224811
PCT Pub. Date: Nov. 28, 2019

(65) Prior Publication Data
US 2021/0363650 A1 Nov. 25, 2021

Related U.S. Application Data

(60) Provisional application No. 62/674,039, filed on May 21, 2018.

(51) Int. Cl.
*H01M 8/0656* (2016.01)
*C25B 3/23* (2021.01)
(Continued)

(52) U.S. Cl.
CPC ............... *C25B 3/23* (2021.01); *C25B 3/07* (2021.01); *C25B 9/17* (2021.01); *C25B 11/052* (2021.01);
(Continued)

(58) Field of Classification Search
CPC ... C25B 11/052; C25B 11/053; C25B 11/061; C25B 11/065; C25B 11/091;
(Continued)

(56) References Cited

U.S. PATENT DOCUMENTS 6,193,871 B1   2/2001   Coates et al.
8,795,555 B2   8/2014   Ma
(Continued)

FOREIGN PATENT DOCUMENTS

EP         1031167 A1      8/2000
WO    WO-2016201302 A1 * 12/2016 ............... G06F 9/46

OTHER PUBLICATIONS

Omasta, Travis J. et al., "Two pathways for near room temperature electrochemical conversion of methane to methanol" ECS Transactions, 2015, 66.8: 129-136 (9 pages).
(Continued)

*Primary Examiner* — Victoria H Lynch
(74) *Attorney, Agent, or Firm* — Roach Brown McCarthy & Gruber, P.C.; Kevin D. McCarthy

(57) ABSTRACT

This invention provides an electrochemical system for manufacturing methanol from methane in good yields and without admixtures of methanol oxidation products. A fuel cell for methane or methanol utilization is also provided.

15 Claims, 13 Drawing Sheets

(51) Int. Cl.
| | |
|---|---|
| *H01M 8/1007* | (2016.01) |
| *C25B 11/061* | (2021.01) |
| *C25B 11/095* | (2021.01) |
| *C25B 15/08* | (2006.01) |
| *C25B 3/07* | (2021.01) |
| *C25B 11/052* | (2021.01) |
| *C25B 11/065* | (2021.01) |
| *C25B 9/17* | (2021.01) |
| *C25B 11/091* | (2021.01) |
| *C25B 11/053* | (2021.01) |
| *H01M 4/86* | (2006.01) |
| *H01M 4/88* | (2006.01) |
| *H01M 4/90* | (2006.01) |
| *H01M 8/1011* | (2016.01) |
| *H01M 8/10* | (2016.01) |

(52) U.S. Cl.
CPC .......... *C25B 11/053* (2021.01); *C25B 11/061* (2021.01); *C25B 11/065* (2021.01); *C25B 11/091* (2021.01); *C25B 11/095* (2021.01); *C25B 15/083* (2021.01); *H01M 4/8657* (2013.01); *H01M 4/8807* (2013.01); *H01M 4/8853* (2013.01); *H01M 4/9008* (2013.01); *H01M 4/9016* (2013.01); *H01M 8/0656* (2013.01); *H01M 8/1007* (2016.02); *H01M 8/1011* (2013.01); *H01M 2008/1095* (2013.01)

(58) Field of Classification Search
CPC ....... C25B 11/095; C25B 15/083; C25B 3/07; C25B 3/23; C25B 9/17; H01M 2008/1095; H01M 4/29; H01M 4/32; H01M 4/628; H01M 4/661; H01M 4/663; H01M 4/8657; H01M 4/8807; H01M 4/8853; H01M 4/9008; H01M 4/9016; H01M 8/06; H01M 8/0656; H01M 8/1007; H01M 8/1011; Y02E 60/10; Y02E 60/50; Y02P 70/50
See application file for complete search history.

(56) References Cited

U.S. PATENT DOCUMENTS

| | | |
|---|---|---|
| 2001/0019799 A1 | 9/2001 | Fetcenko et al. |
| 2014/0124381 A1 | 5/2014 | Fan |

OTHER PUBLICATIONS

International Search Report for PCT/IL2019/050565, dated Aug. 20, 2019; 7 pages.
Written Opinion of the International Searching Authority for PCT/IL2019/050565, dated Aug. 20, 2019; 5 pages.

\* cited by examiner

A

B

ELECTROCHEMICAL OXIDATION OF METHANE TO METHANOL

FIELD OF THE INVENTION

The present invention relates to the field of energy storing, particularly to the field of converting methane to methanol. The invention provides a system for electrochemical oxidation of methane in high yields with decreased amounts of admixtures of methanol oxidation products.

BACKGROUND OF THE INVENTION

Methane is the main component in natural gas and its importance was enlightened by the reduction of oil sources, increasing fossil fuel prices and the recent natural gas reserves discoveries. Methane has very attractive utilities, including its use as a synthetic material for the chemical and petrochemical industries, in hydrogen manufacturing, in fuel production by Fischer Tropsch method (gas to liquid—GTL), as a fuel for transportation (compressed natural gas—CNG), and in electricity production and heating.

Unfortunately, methane has two major limitations. The first is that it has low reactivity due to high C—H energy bond. The second is that it usually resides in remote locations which results in transportation and on-site utilization problems. One may assume condensation of the gaseous methane (liquid natural gas—LNG) by low temperature (−160° C.) or high pressure (200-250 atm) will solve the problem, but these processes require high costs due to the extreme conditions. Therefore, in order to exploit methane resources more efficiently, its conversion to methanol would be desired. Methanol has a great economic interest as a derivative of methane. Liquid methanol's utility as a transportable fuel has a great importance in trying to solve the transportations and storage problems related to the use of gaseous methane. In addition, methanol is considered as a promising material in the chemical and energy industries.

However, converting methane to methanol is quite difficult. The common industrial process comprises formidable reaction conditions (operating temperatures of 300-800° C. and pressures of 20-40 atm), high costs, and inefficient yields. The main challenge is to find a catalytic system which would activate the inert C—H bond under moderate conditions. Attempts with homogeneous and heterogeneous chemical processes either have not accomplished the desired conditions or have not achieved sufficient yields.

Oxidation of methane using Pt as catalyst has been accomplished by Shilov reaction, which is an example for selective oxidation of methane to methanol. The reaction proceeds in aqueous solution, at 120° C., with $Pt(II)Cl_4^{2-}$ as catalyst but $Pt(IV)Cl_6^{2-}$ has to be added as a stoichiometric oxidant:

$$CH_4 + PtCl_6^{2-} + H_2O \rightarrow CH_3OH + PtCl_4^{2-} + 2HCl \quad (1)$$

There are also reports concerning oxidation of C—H by catalysts based on Pd(II) (with the addition of Cu(II), benzoquinone or Ag(I)) as stoichiometric oxidants.

Electrochemical oxidation of methane can be considered to be an attractive method to synthesize methanol at mild conditions. For example, it has been reported that it is possible to selectively oxidize alkanes by activated species of oxygen [O*] which are electrochemically produced. These species can be formed at fuel cells cathodes:

$$O_2 + 2H^+ + 2e \rightarrow O^* + 2H_2O \quad (2)$$

The species O* can oxidize certain alkanes, such as ethane and propane to oxygenated products at low temperature (<80° C.). However, (a) such temperatures, typical of polymer electrolyte fuel cells (PEMFCs), are not always sufficient to oxidize methane to methanol; and (b) the products of these reactions are not alcohols, but rather aldehydes and $CO_2$.

Another approach is to produce O* at an anode of a water splitting electrolytic cell, i.e. in conditions in which oxygen is produced from water oxidation:

$$2H_2O \rightarrow O_2 + 4H^+ + 4e^- \quad (3)$$

The electrosynthesis of methanol production from methane in this case runs according to:

$$CH_4 + 2H_2O \rightarrow CH_3OH + \tfrac{1}{2}O_2 + 4H^+ + 4e \quad (4)$$

This reaction has been reported to occur on $TiO_2/RuO_2$ anodes. However, methanol was not the only product: formaldehyde and formic acid were also produced in significant quantities (maximum current efficiency of 30% for methanol).

The electrochemical oxidation of $CH_4$ at low temperatures (<100° C.) has been recently reviewed (Baltrusaitis J. et al.: Catal. Sci. Technol. 4, 2014, 2397). From this review it can be concluded that (a) most of the experiments were conducted in aqueous electrolytic cells, (b) most of the working electrodes used were rare metals, such as Pt and Pd, and (c) the product produced eventually was $CO_2$; although methanol and other oxygenated hydrocarbons were detected as intermediate species or final products.

The direct oxidation of methane is, in principle, possible in a galvanic cell (fuel cell) rather than in an electrolytic cell which has to be supplied with electrical energy. Although this has been tried in solid-oxide fuel cells (SOFCs) with zirconia and perovskite-type oxide electrolytes, these electrolytes require high temperature above 500° C. to show sufficient ionic conductivities. The low temperature (298 K) oxidation of light alkanes (such as ethane and propane, but not methane) to oxygenates at polymer electrolyte and phosphoric acid fuel cell cathodes has been shown. A more selective oxidation of methane to methanol (and mostly $CO_2$) was described at a $H_2/O_2$ fuel cell PdAu/C cathode using $Sn_{0.9}In_{0.1}P_2O_7$ as electrolyte at temperatures between 50 and 250° C.

It seems possible to oxidize methane to $CO_2$ and methanol (although no evidence is given that the process produces methanol at all) on a fuel cell electrode with a catalyst comprised of a platinum precursor supported by particles of a heteropolyanion. It can be concluded that the selectivity of catalysts based on noble metals such as Pt or Pd and non-noble metal oxides such as $V_2O_5$ towards the production of methanol is usually low. The electrochemical oxidation of methane to methanol produces high yields of $CO_2$, formaldehyde and formic acid; the overall rate of oxidation to methanol is very low (for example ~0.4 µmol h$^{-1}$ cm$^2$ at 250° C.). It is therefore an object of this invention to provide a new electrochemical system which overcomes the drawbacks of the known systems.

Other objects and advantages of present invention will appear as the description proceeds.

SUMMARY OF THE INVENTION

This invention provides an electrochemical cell for oxidizing methane ($CH_4$) to methanol ($CH_3OH$), comprising i) an electrode comprising nickel in an oxidized form selected from the group consisting of nickel hydroxide ($Ni(OH)_2$), nickel oxide hydroxide (NiOOH), and nickel foam; and ii) an electrolyte comprising a base, such as a hydroxide or carbonate solution, in contact with said electrode; iii) pressurized $CH_4$ source configured to deliver gaseous $CH_4$ to the electrode surface; iv) voltage source connected with said electrode; v) means for reducing thermodynamic activity of $CH_3OH$ near the surface of said electrode; wherein said cell produces $CH_3OH$ when an electric current flows through the cell. Said means for reducing thermodynamic activity of $CH_3OH$ near the surface of said electrode aim at lowering the tendency of methanol to participate in further reactions leading to various oxidation products or even $CO_2$, by lowering its "effective concentration" or chemical potential for those reactions; further oxidation of methanol is thus prevented. The cell of the invention comprises $Ni(OH)_2$/NiOOH grown on its surface, preferably from a precursor. In a preferred embodiment, said $Ni(OH)_2$/NiOOH may be grown electrolytically on the electrode surface from a nickel foam precursor.

Said electrolyte may comprise an aqueous KOH, NaOH, $K_2CO_3$, or $Na_2CO_3$ solution at concentrations of at least 1 mmol/l. Said methane source preferably comprises a pressurized $CH_4$ container and a dispersal means for delivering and dispersing the $CH_4$ gas on the interface between the electrode and the electrolyte, possibly comprising an electrode porous structure (as provided by carbon paper serving as a gas diffusion electrode). Said voltage source is configured to provide stable and high output voltage between 0.5 and 1.5V. Said means for reducing thermodynamic activity of $CH_3OH$ comprises, in one preferred embodiment, a distillation unit. In another embodiment, said means for reducing thermodynamic activity of $CH_3OH$ comprises a catalytic bilayer coating on the surface of said electrode. In a preferred embodiment, the cell of the invention comprises a catalytic bilayer consisting of a layer of an electropolymerized manganese porphyrin over a layer of electrochemically prepared $Ni(OH)_2$/NiOOH. In some embodiments, manganese may be replaced with iron or ruthenium. Preferably, said electrode comprises a carbon paper substrate onto which a catalytic bilayer is formed; the first layer, in contact with said substrate, being electrochemically prepared $Ni(OH)_2$/NiOOH, and the second layer, in contact with said $Ni(OH)_2$/NiOOH, being electropolymerized manganese porphyrin, or Fe or Ru porphyrin.

The invention is directed to a fuel cell comprising an electrochemical cell for oxidizing methane ($CH_4$) to methanol ($CH_3OH$), which comprises i) an electrode comprising nickel in an oxidized form selected from the group consisting of nickel hydroxide ($Ni(OH)_2$), nickel oxide hydroxide (NiOOH), and nickel foam; and ii) an electrolyte comprising a hydroxide in contact with said electrode; iii) pressurized $CH_4$ source configured to deliver gaseous $CH_4$ to the electrode surface; iv) voltage source connected with said electrode; v) means for reducing thermodynamic activity of $CH_3OH$ near the surface of said electrode; wherein said cell produces $CH_3OH$ when an electric current flows through the cell.

The invention provides a process for producing methanol ($CH_3OH$) from methane ($CH_4$), comprising i) providing an electrochemical cell having an anode in contact with aqueous KOH and an inert cathode; ii) electrochemically creating a $Ni(OH)_2$/NiOOH layer on said anode, preferably on a nickel foam; iii) delivering and dispersing pressurized $CH_4$ from a pressurized source to the interface between said anode and said aqueous KOH; iv) applying direct voltage on said electrodes resulting in direct current in said cell, resulting in oxidation of said $CH_4$ to $CH_3OH$; v) employing means for reducing thermodynamic activity of $CH_3OH$ near the surface of said electrode, the means preventing oxidation of said $CH_3OH$; wherein said methanol is collected or further used in a fuel cell as an energy source. In one aspect of the invention, said step v) includes heating the anode space and continual removal of the formed $CH_3OH$ by distillation. In one embodiment, said heating may comprise heating the anode space to 80° C.; in a preferred embodiment, said step iv) comprises applying voltage 0.75 V. In another important aspect of the invention, the process of the invention further comprises a step of electrochemically creating a manganese (or Fe or Ru) porphyrin layer after said step of electrochemically creating the layer of $Ni(OH)_2$/NiOOH, forming a catalytic bilayer efficiently oxidizing $CH_4$ to $CH_3OH$ in said step iv) whereby creating means for reducing thermodynamic activity of $CH_3OH$ near the surface of said electrode, thereby precluding the oxidation of methanol. Said anode comprising the bilayer is preferably coated with a carbon paper substrate onto which the catalytic bilayer is formed consisting of a $Ni(OH)_2$/NiOOH layer in contact with said substrate and an electropolymerized manganese porphyrin layer in contact with said $Ni(OH)_2$/NiOOH.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

Figure 1:
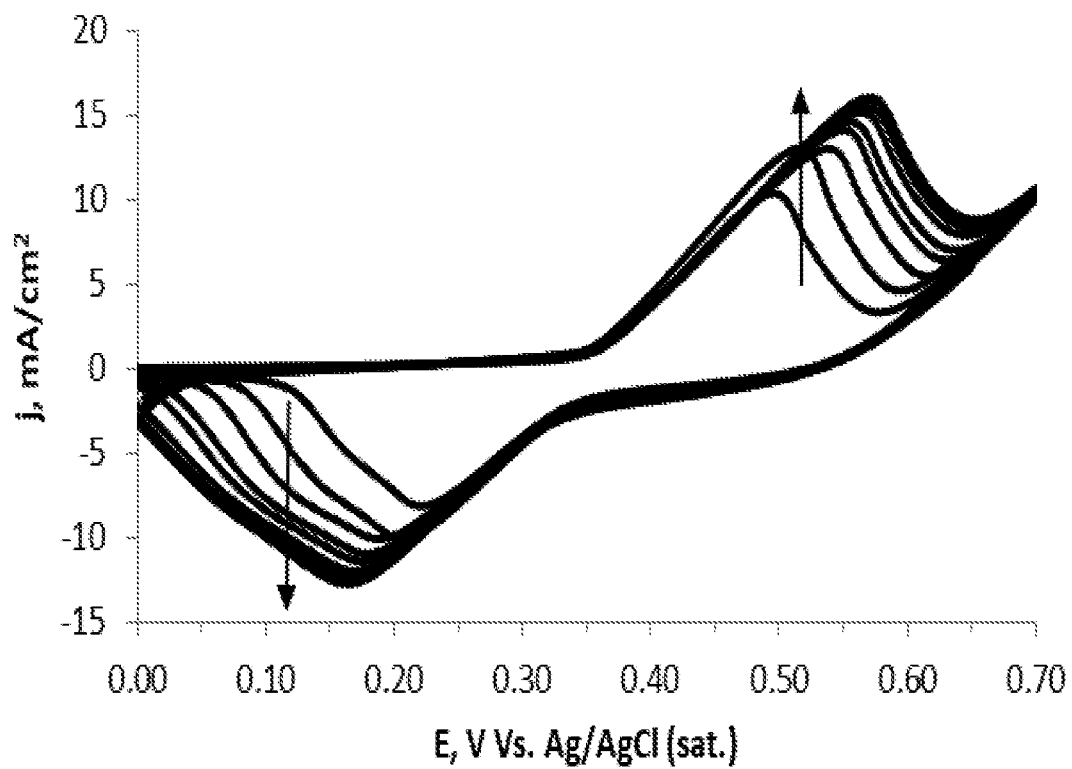
FIG. 1. shows the growth of $Ni(OH)_2$/NiOOH layer on the nickel foam during the cyclic voltammetric process (100 mV/s) in 1.0 M KOH.

It has now been found that the known problem of selectively oxidizing methane to methanol in sufficient yields, and without obtaining a mixture of additional oxidation products, can be solved by lowering effective concentration of the formed methanol near the electrode surface.

Methane oxidation is achieved in a new electrochemical system which overcomes the drawbacks described in the literature. The system is based on the following concepts: (a) Use of an electrode made of a material (Ni foam) which is a precursor of the catalyst ($Ni(OH)_2$/NiOOH), which is grown on its surface and which also allows high oxidation rates due to its porous structure. The oxidation of methane by NiOOH formed on a nickel plate by the reaction $Ni(OH)_2 + OH^- \rightarrow NiOOH + H_2O + e^-$ was described but the product was $CO_2$.
(b) Higher selectivity towards oxidation to methanol is achieved i) in one aspect by removing methanol from the electrode before it is further oxidized to $CO_2$ by means of distillation; or ii) in another aspect by overcoming the high rates of water oxidation to oxygen gas (side reaction) via designing a new anode for the oxidation of methane; this anode is based on a carbon paper substrate coated with a catalytic bilayer composed of an electropolymerized manganese porphyrin (can be replaced with Fe or Ru porphyrins) on top of an electrochemically prepared nickel hydroxide film; the anode is demonstrated to operate in a fuel cell configuration at room temperature and generates electricity.

In view of the invention, it can be noted as follows.
i) The redox couple $Ni(OH)_2$/NiOOH is capable to electrocatalytically oxidize methane. High oxidation currents are obtained for methane oxidation when using anodes consisting of nickel foams coated with this catalyst, and possibly including other oxygen donor molecules, within the class of oxo-metalloporphyrins (such as Fe(IV)-, Mn(IV or V)-, and Ru(IV)-oxoporphyrins).

ii) The redox couple $Ni(OH)_2$/NiOOH can drive the oxidation of methane in aqueous base electrolyte solution at ambient or near-ambient (25-80° C.) temperatures.
iii) Obtaining methanol rather than $CO_2$ as the main product by electrochemically grown $Ni(OH)_2$/NiOOH redox couple as described here and examined in basic aqueous solutions is possible by coupling a distillation unit to electrochemical cell.
iv) Another strategy of avoiding full oxidation of methane to $CO_2$ is by using an anode with a catalytic bilayer composed of a Mn (or Fe or Ru) porphyrin layer on top of a $Ni(OH)_2$ layer in an electrochemical cell devoid of a distillation unit. The catalytic bilayer can be coated on conductive substrates, such as carbon paper.
v) The current efficiency of methane oxidation vs. water oxidation obtained by the bilayer catalytic film is 62% at 0.7V (vs. Hg/HgO), which is ~7 fold higher than the one obtained by $Ni(OH)_2$ film alone in aqueous base solution.
vi) The resulting catalytic electrodes can be used as anodes in direct methane fuel cells (oxygen instead of protons reduction at the cathode) operating at low temperatures (25-80° C.) which will then not only convert methane to methanol but can also serve as an energy source.

This invention thus provides an electrochemical system for manufacturing methanol from methane in good yields and without admixtures of methanol oxidation products, and also enables to obtain a fuel cell for efficiently utilizing methane as fuel and for the production of methanol.

The invention will be further described and illustrated by the following examples.

EXAMPLES

Example 1

Preparation of the Catalytic Working Electrode

A Ni foam (MTI corporation, EQ-bcnf-16m, surface density: 346 g/m², 80-100 pores per inch, average hole diameter: 0.25 mm) coated with the $Ni(OH)_2$/NiOOH catalyst was used as the catalytic working electrode for the electrocatalytic oxidation of methane. The coating was performed by cyclic voltammetry in a 1.0 M KOH solution at room temperature, as illustrated in FIG. 1. The optimal conditions for this procedure were: scan rate: 100 mV/s, 70 first cycles between 0 and 0.65 V and then 130 cycles between 0 and 0.7 V vs. Ag/AgCl/$KCl_{satd}$. The counter electrode was a Pt wire.

Example 2

Electrocatalytic Oxidation of Methane in Aqueous Solutions

Figure 2:
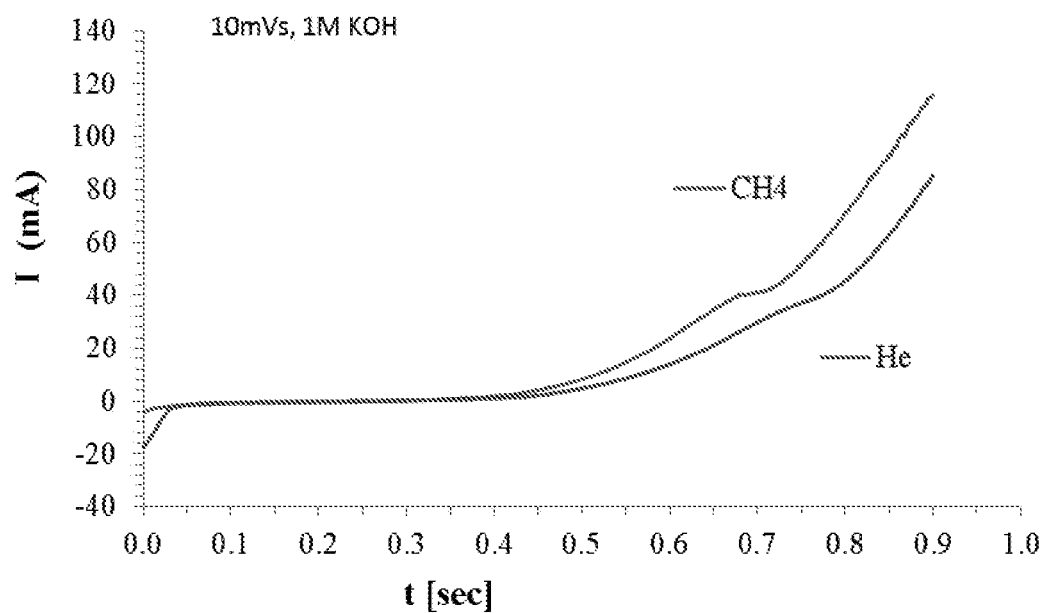
FIG. 2. is a linear sweep voltammogram (10 mV/s) for a $Ni(OH)_2$-coated Ni foam electrode (geometrical area exposed to the solution: ~2 cm$^2$) in 1.0 M KOH at 77±3° C. during continuous supply (~75 cc/min) of either He or methane.

Linear sweep voltammetry conducted in aqueous solution of 1.0 M KOH at 77±3° C. in a half-cell configuration using $Ni(OH)_2$/NiOOH coated Ni foam as working electrode, Pt wire as counter and AgCl-coated Ag wire reference (more stable than Ag/AgCl/$KCl_{satd}$. at these temperatures) electrodes are shown in FIG. 2 for two cases: continuous supply of He or methane (~75 cc/min) to the solution. It can be seen that the oxidation of $Ni(OH)_2$ to NiOOH occurs in the absence and presence of methane at 0.65-0.75 V and the oxidation currents are increased by the presence of methane. The current increases steeply beyond this potential range due to direct $OH^-$ oxidation.

Figure 3:
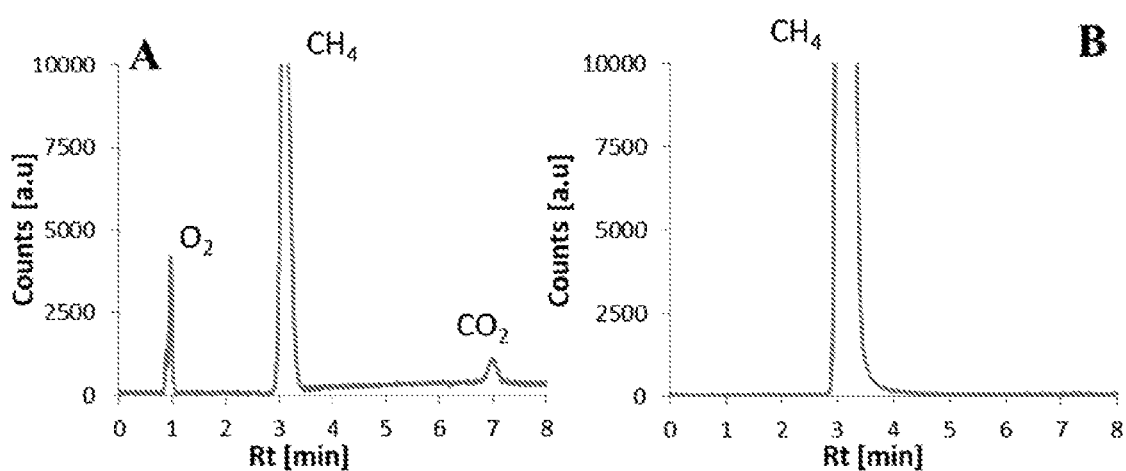
FIG. 3. a gas chromatogram for the headspace gas formed by applying +0.75V vs. Hg/HgO for 2 hours in 0.1M KOH, while using high-surface-area nickel foam electrode coated earlier with $Ni(OH)_2$; TCD and FID detectors are connected in-series, the results are shown in A and B, respectively; an embodiment without a distillation unit is employed.

The gas phase analysis by Agilent's gas chromatograph (equipped with TCD and FID connected in-series) was carried out (FIG. 3) using a Ni foam electrode coated by $Ni(OH)_2$. FIGS. 3A and 3B relate to the TCD and FID plots respectively. The results indicate absence of methanol as product and the presence of $CO_2$ as the only gaseous product of the electrochemical oxidation in these conditions.

Figure 4:
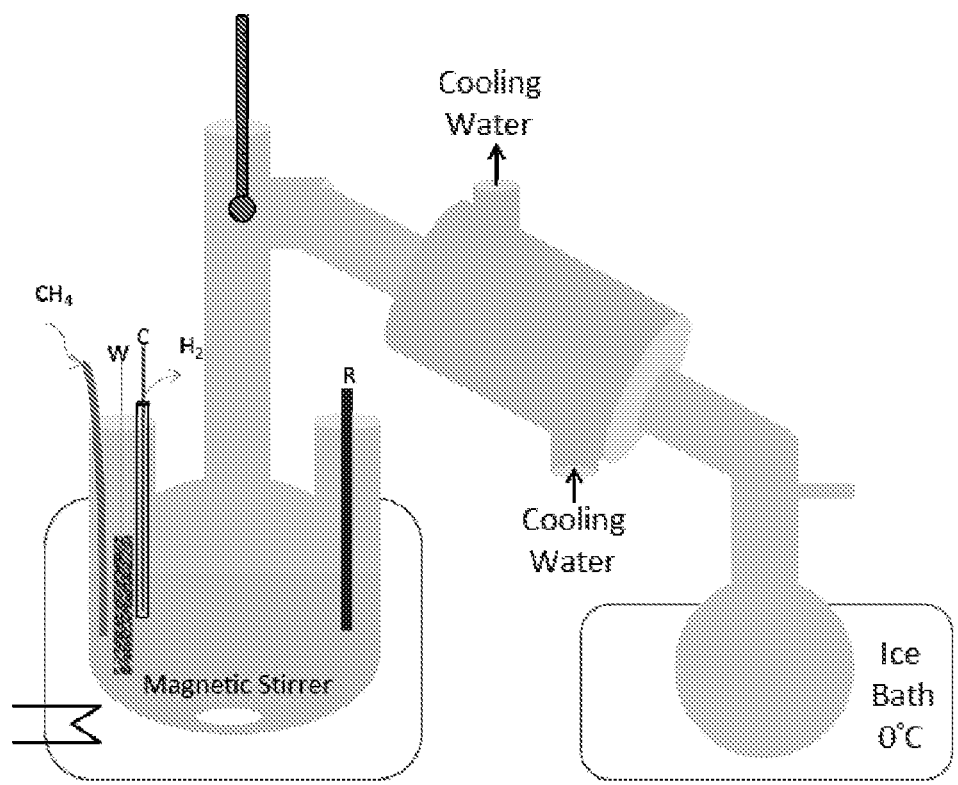
FIG. 4. is a scheme of a combined electrochemical-distillation system according to one embodiment of the invention; W, C, and R represent the working ($Ni(OH)_2$-coated Ni foam), counter (Pt wire), and reference (AgCl-coated Ag wire) electrodes, respectively.
Figure 5:
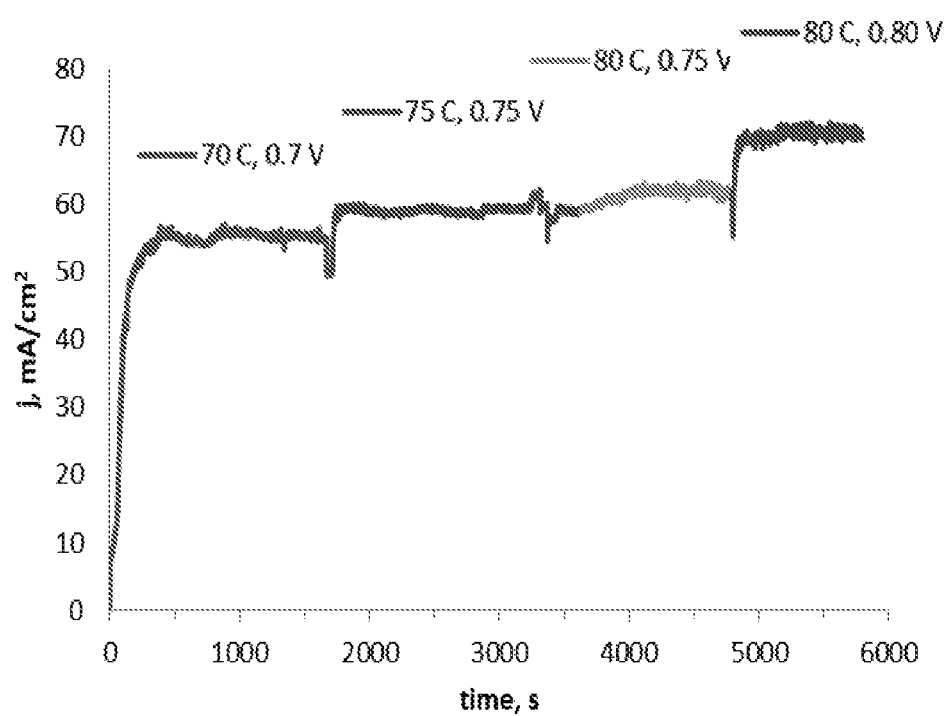
FIG. 5. demonstrates chronoamperometric responses for a $Ni(OH)_2$/NiOOH coated Ni foam (A ~1 cm$^2$) obtained for the oxidation of methane continuously supplied (~75 cc/min) to a solution of 1.0 M KOH at conditions indicated in the figure; an embodiment comprising a distillation unit is employed.

To prevent the total oxidation of methane to $CO_2$, the electrochemical cell was combined with a distillation system, as schematically presented in FIG. 4, and operated at constant potential: first at 0.70, and then at 0.75 and 0.80 V and at temperatures rising from 70 to 80° C. The chronoamperometric (CA) responses obtained at these conditions are shown in FIG. 5. Distillates were collected after each CA experiment conducted at T≥75° C. and were analyzed by gas chromatography (GC). Table 1 summarizes the results obtained in these experiments.

TABLE 1

Summary of chronoamperometric experiments conditions and results.

| Conditions | 75° C., 0.70 V | 80° C., 0.75 V | 80° C., 0.80 V |
|---|---|---|---|
| Steady state current density (mA/cm$^2$) | 55 | 62 | 70 |
| Methanol concentration in distillate (ppm) | 58 ± 7 | 1000 ± 50 | 60 ± 2 |
| Electrochemical yield (%) | 0.34 | 4.75 | 0.52 |

Figure 6:
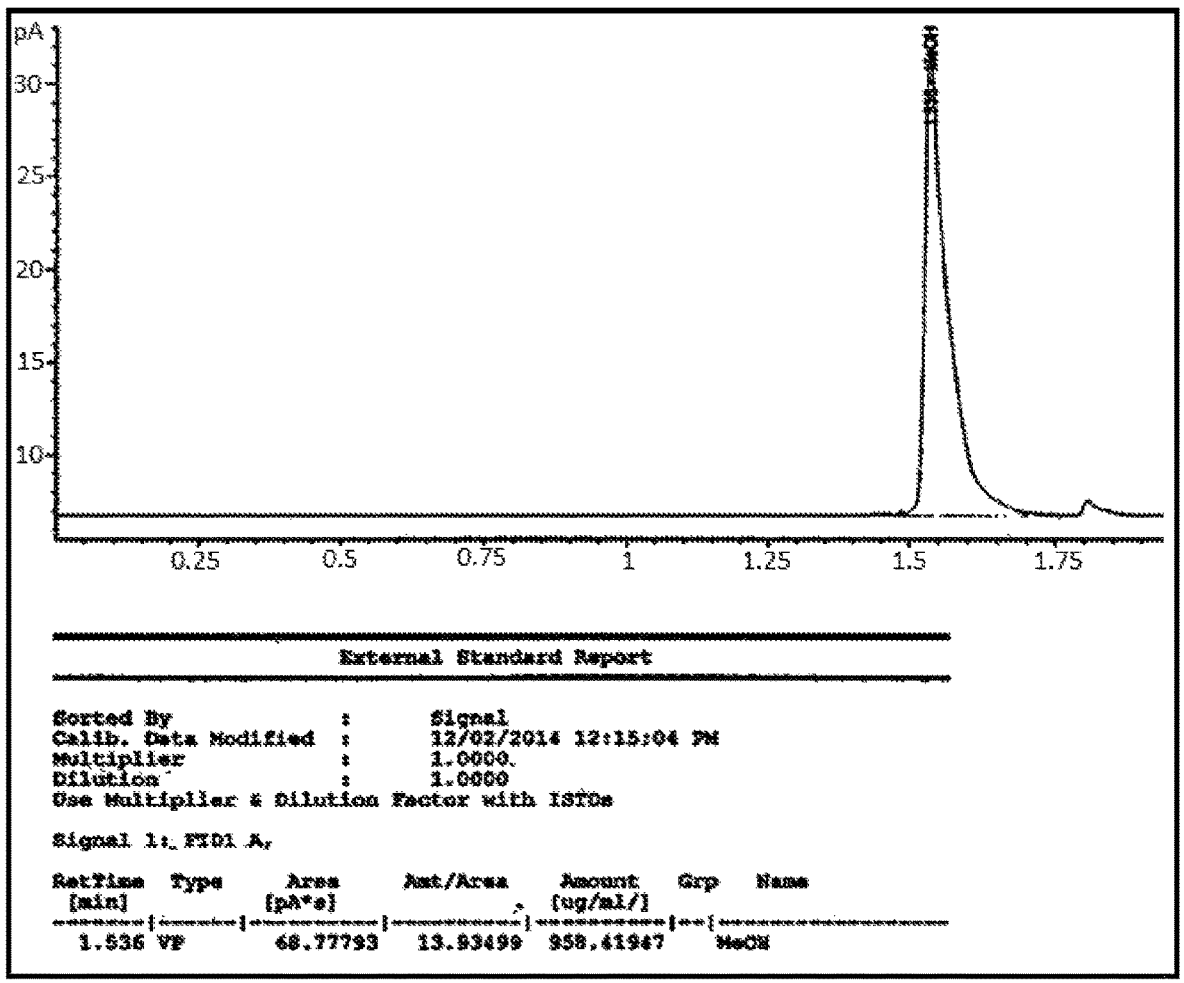
FIG. 6. shows GC analysis of the product obtained at 0.75 V and 80° C.
Figure 7:
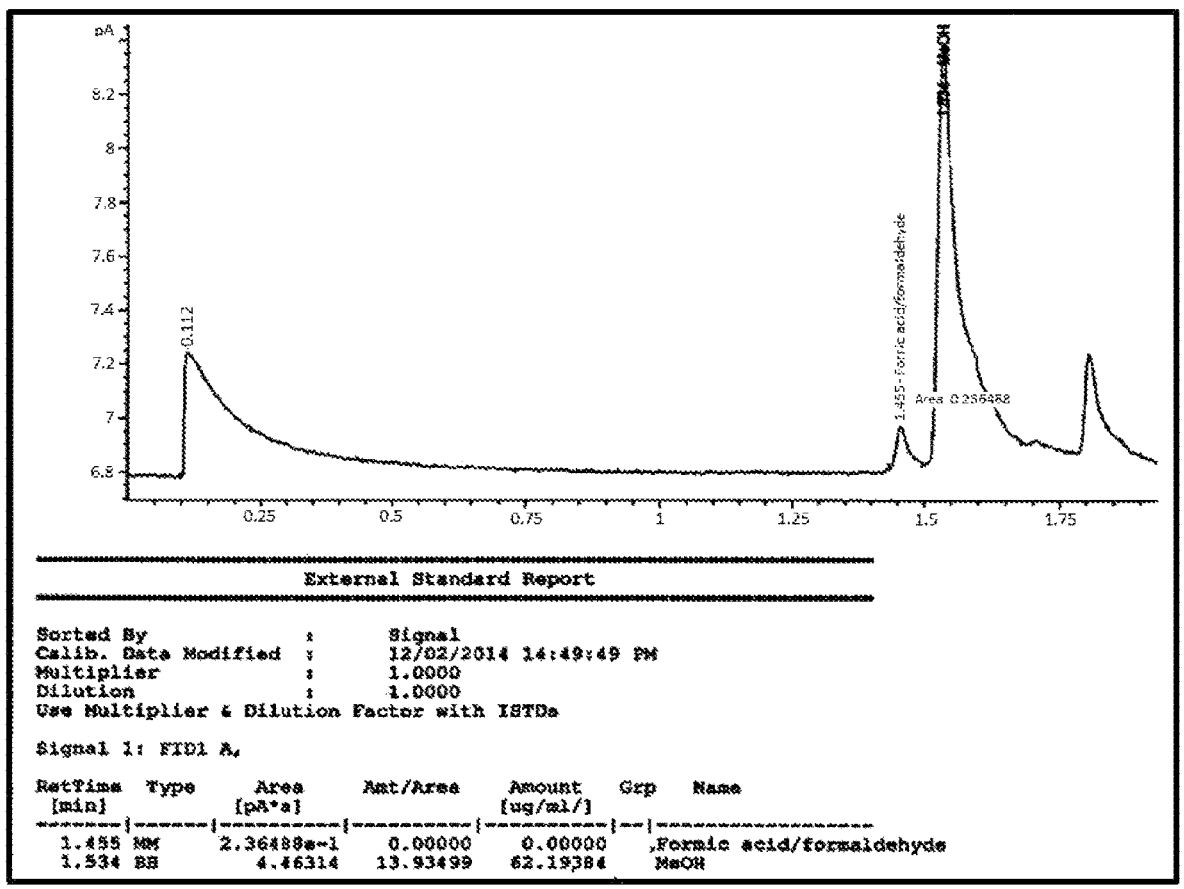
FIG. 7. Shows GC analysis of the product obtained at 0.8 V and 80° C.

According to Table 1, the best conditions for the electrochemical conversion of methane to methanol are at a temperature of 80° C. and an applied potential of 0.75V. The higher concentration of methanol as product as well as the highest electrochemical yield are obtained in these conditions. The narrow potential range in which the yield reaches its maximum value is in accordance to the sweep voltammetric experiments (FIG. 2) which indicate direct water/OH (rather than methane) oxidation at E≥0.75 V. Moreover, while methanol was the only product obtained in these conditions, as determined by GC (FIG. 6), by-products (formaldehyde/formic acid) were found in the distillate collected after increasing the potential to 0.80 V (FIG. 7).

Example 3

Electrooxidation of Methane at a Catalytic Bilayer Anode

Figure 8:
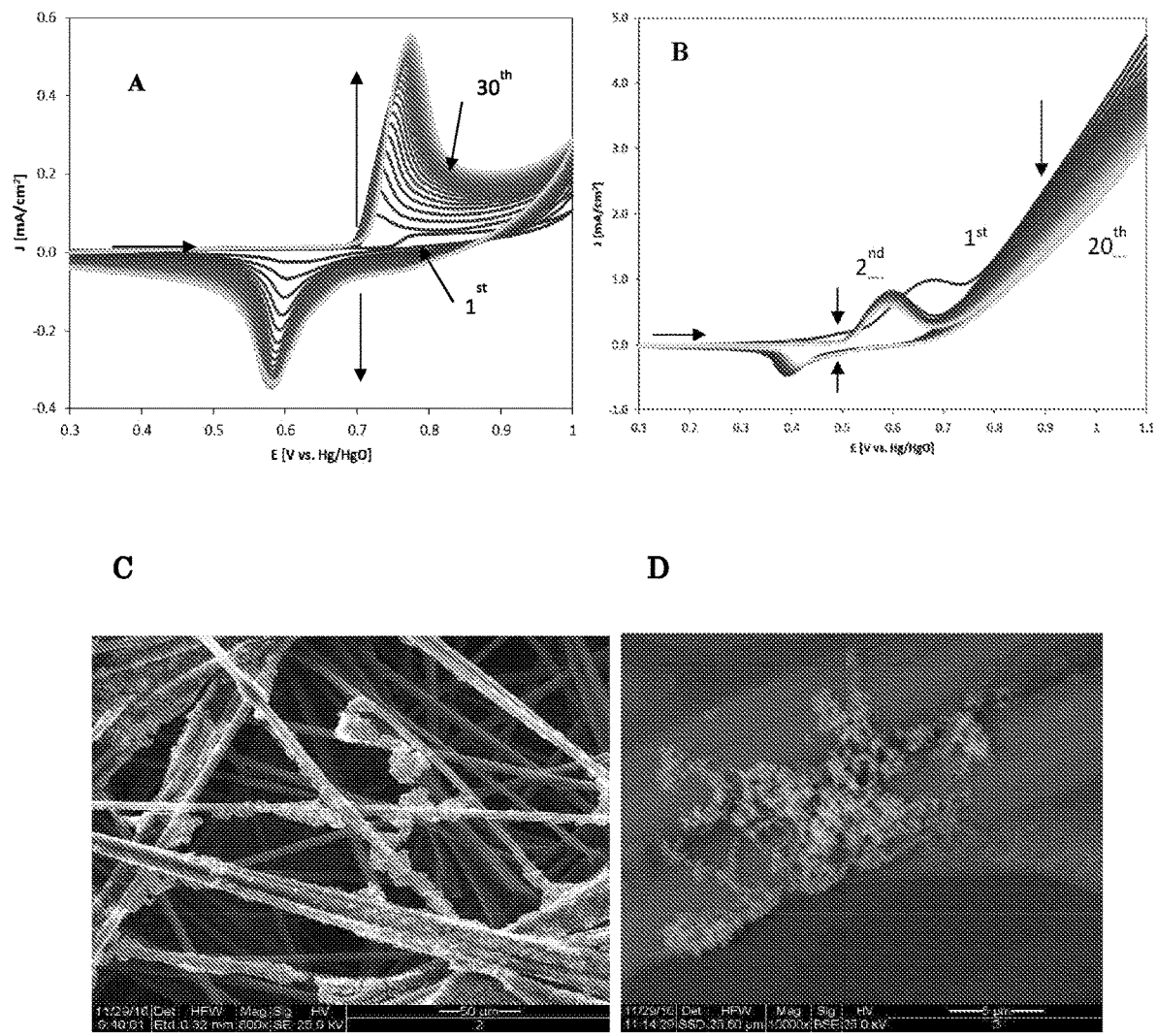
FIG. 8. describes two stages preparation of the bilayer catalytic coating growth on CP; the first stage is the $Ni(OH)_2$/NiOOH layer growth on carbon support by continuous cyclic voltammetric process as shown in A; the second stage is the electropolymerization of the Mn-porphyrin on top of the first layer by continuous cyclic voltammetric process as shown in B; C and D are SEM pictures after each stage, the length scales are 50 and 5.0 μm in C and D, respectively.

The anode was prepared by two sequential steps. The first step was the growth of the $Ni(OH)_2$ film by electrodeposition from a solution containing 0.01M $NiSO_4*(H_2O)_6$ and 0.1M $Na_2CO_3$ (pH 11.2) on carbon paper (CP, Manufacturer: Engineered Fibers Technology, model: Spectracrab GDL1240, thickness 0.3 mm, density 0.40 g/cm$^3$). The electrodeposition was carried out using cyclic voltammetry at room temperature, with 30 continuous cycles at a scan rate of 25 mV/sec in the potential range 0 to +1.0 V vs. Hg/HgO, as illustrated in FIG. 8A. The second catalytic layer consisted of Manganese(III)-Tetrakis(4-hydroxyphenyl)porphyrin chloride (Midcentury, 85% dye content) which was electropolymerized on top of the first layer, in 0.1M KOH solution (pH=13) using cyclic voltammetry for 20 cycles at a scan rate 25 mV/sec between 0 to +1.1 V vs. Hg/HgO, as demonstrated in FIG. 8B. The metalloporphyrin concentration was 0.5 mg/mL. The counter electrode was a Pt wire for both processes. The decrease in current density during the cycling of potential (FIG. 8B) seems to indicate charge transfer limitations in the growing bilayer coating. SEM images obtained after the growth of the first and second layer as shown in FIGS. 8C and 8D, respectively, seem to indicate homogeneous distribution of the coatings on the CP fibers.

Example 4

Electrocatalytic Oxidation of Methane in Aqueous Solutions at CP Electrodes

Figure 9:
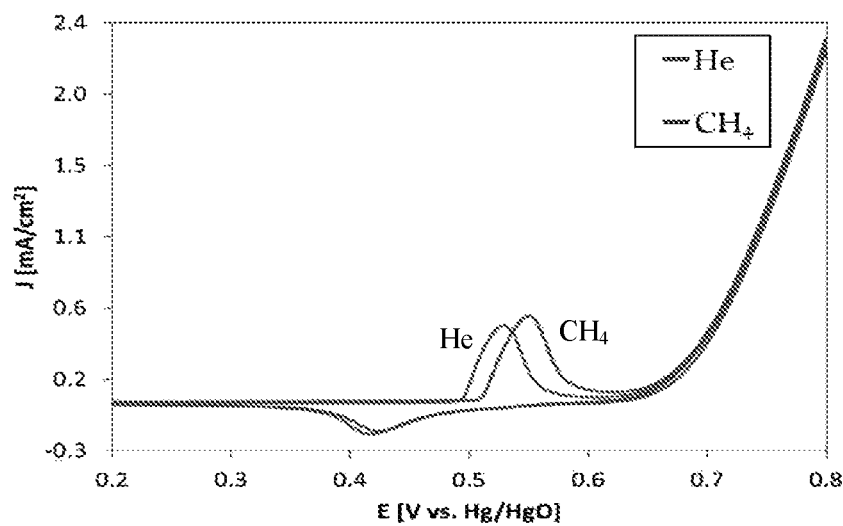
FIG. 9. shows cyclic voltammetry of CP coated either with nickel hydroxide film (A) or Mn-porphyrin film (B) in the presence of helium or methane gasses in 0.1M $Na_2CO_3$, pH 11.2.
Figure 9:
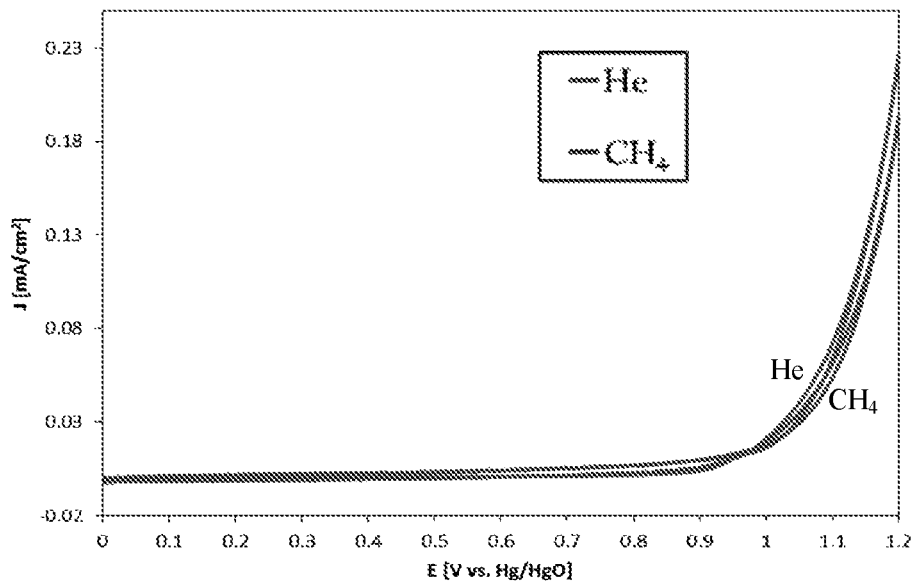
Figure 10:
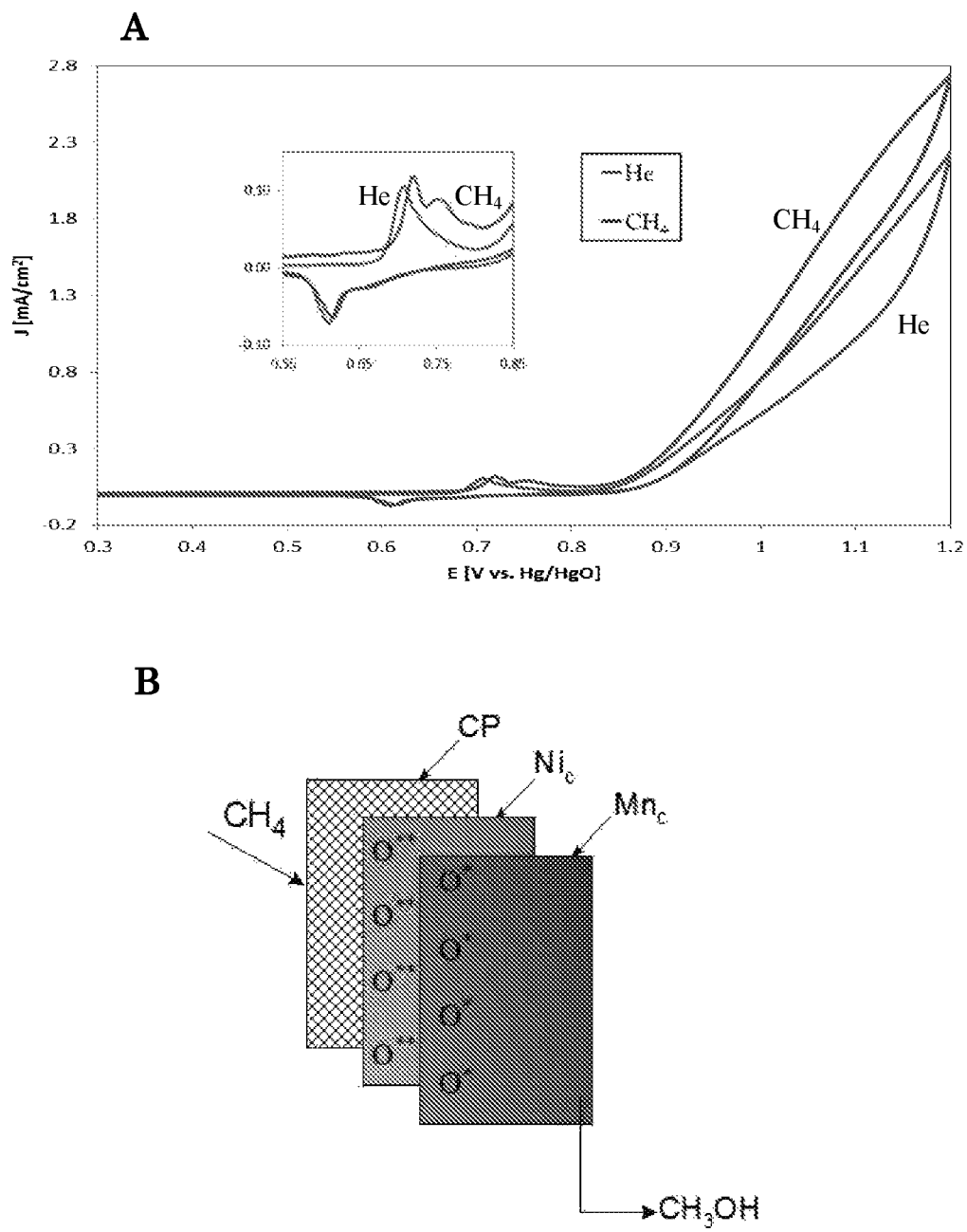
FIG. 10. shows the synergetic effect of the bilayer (A); a schema of the electrode process related to FIG. 9 is shown (B), showing the CP with the bilayer catalytic coating and in which active oxygen is transferred from the $Ni(OH)_2$ layer to the Mn porphyrin one, leading to higher selectivity of methane oxidation.

Cyclic voltammetry (CV) was conducted in 0.1 M $Na_2CO_3$ at room temperature with a CP electrode (1.50 cm$^2$), Pt wire (~2 cm$^2$), and Hg/HgO as working, counter, and reference electrodes, respectively. The CV plots, obtained after saturation of the solution with He or $CH_4$, are shown in FIG. 9. FIG. 9A shows the plots obtained in the absence or presence of methane with CP coated with a single layer of $Ni(OH)_2$. The peak potential (Ep) of the $Ni(OH)_2$/ NiOOH is shifted anodically with a small increase in peak current (ip) in the presence of methane while no significant change is observed at E>0.7 V. FIG. 9B shows the plots obtained in the absence or presence of methane with CP coated with a single layer of electropolymerized Mn porphyrin. The currents in the presence of methane do not differ from those obtained in its absence in the 0 to +1 Volt range and they are even lower at higher potential. However, a synergetic effect is observed for the bilayer catalytic electrode, as shown in FIG. 10A. The presence of methane in this case causes splitting of the oxidation Ni(II)/Ni(III) peak and a significant current density increase at E>0.9 V. The suggested mechanism is schematically depicted in FIG. 10B. The NiOOH obtained at the bottom layer provides active oxygen capable to oxidize methane to $CO_2$ and simultaneously oxidize water to $O_2$. However, this active oxygen reacts with the Mn(III) porphyrin upper layer to generate a higher oxidation state Mn (IV or V)-oxo complex. The active oxygen in this compound is less active than that of NiOOH and reacts with methane to form methanol. Moreover, the selectivity of oxidation of methane rather than water oxidation at high potentials is achieved with the bilayer coated electrode as compared to the $Ni(OH)_2$ coated one (FIGS. 10A and 9A, respectively).

Figure 11:
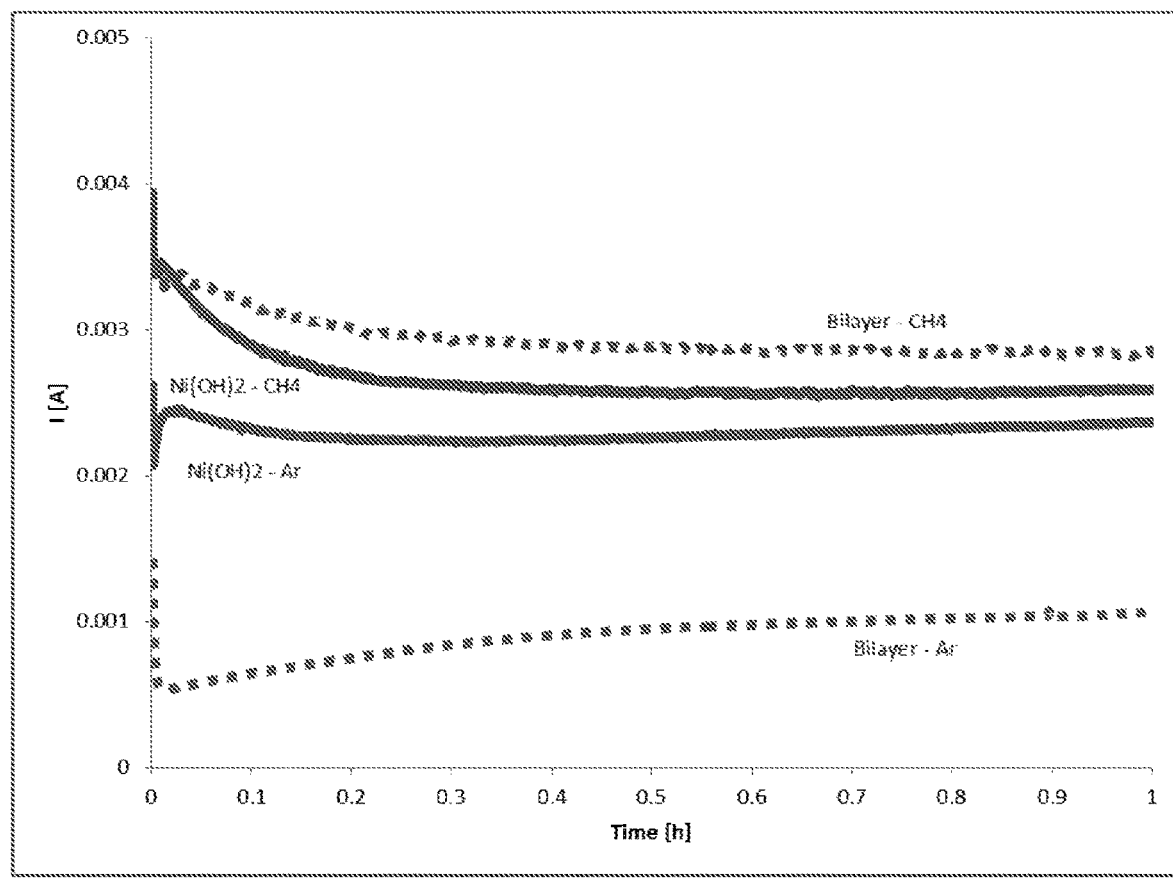
FIG. 11. are current vs. time curves obtained by CA at a potential of +0.7V (vs. Hg/HgO) in 0.1M KOH for CP coated with $Ni(OH)_2$ and CP coated first with $Ni(OH)_2$ and then with Mn porphyrin in the absence and presence of methane gas.

FIG. 11 shows the current vs. time curves obtained by CA at a potential of +0.7V (vs. Hg/HgO) in 0.1M KOH for CP coated with $Ni(OH)_2$ and CP coated first with $Ni(OH)_2$ and then with Mn porphyrin. The current efficiency for $CH_4$ oxidation ($i_{CH_4}$) was calculated by the following equation:

$$i_{CH_4} = \frac{i_{Total} - i_{H_2O}}{i_{Total}} * 100\%$$

Where $i_{Total}$ is the steady state current when $CH_4$ is constantly supplied to the solution and $i_{H_2O}$ is the current obtained when supplying an inert gas. The current efficiencies were determined to be 9 and 62%, for CP/$Ni(OH)_2$ and CP/$Ni(OH)_2$/Mn porphyrin, respectively. It can therefore be deduced that a ~7 fold higher selectivity towards $CH_4$ rather than $H_2O$ oxidation is obtained with the bilayer configuration.

Figure 12:
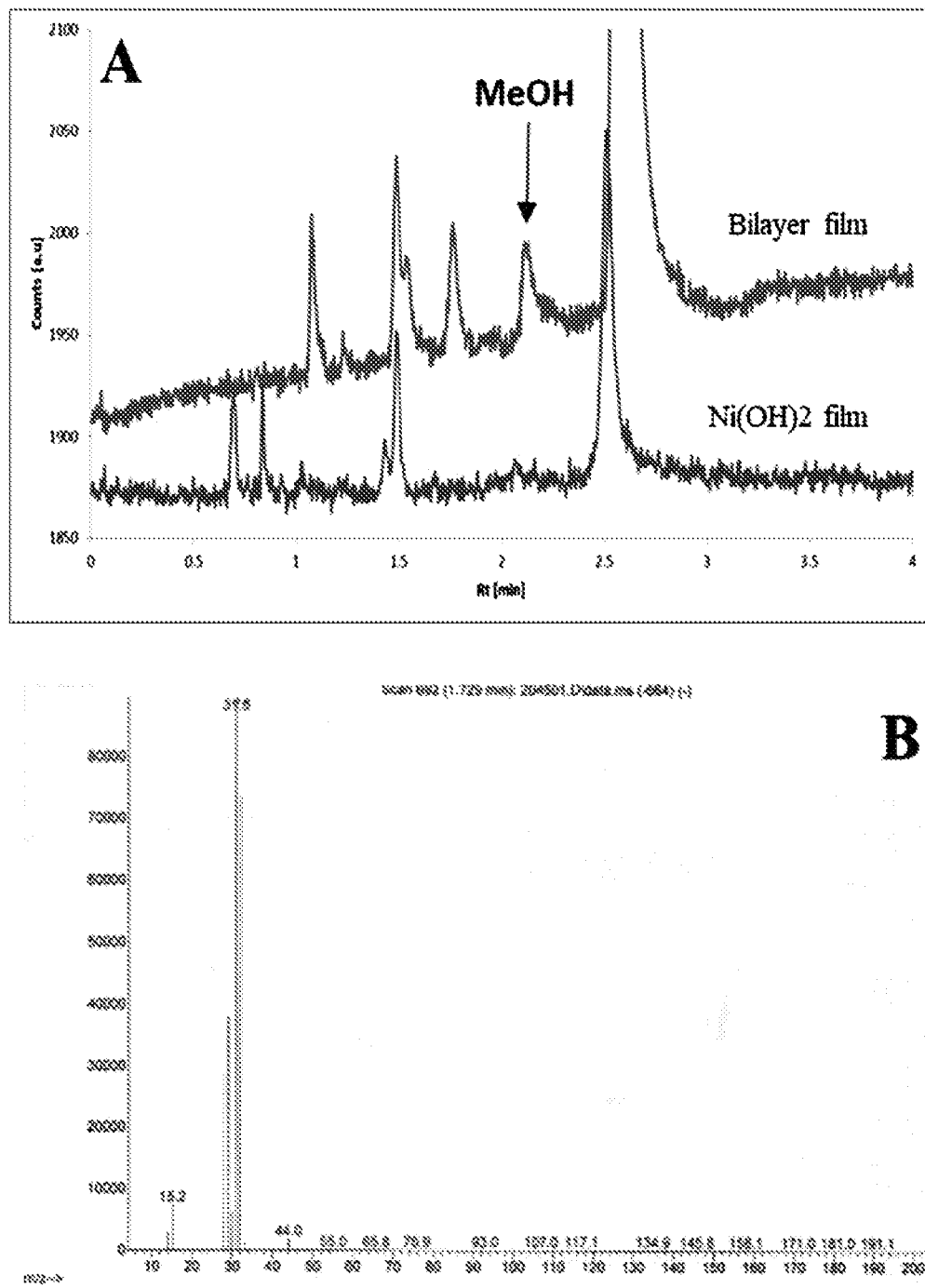
FIG. 12. shows GC analysis after 2 h of CA at +0.75V (vs. Hg/HgO) in 0.1M KOH using CP electrodes coated with nickel hydroxide (blue) and the bilayer (red) catalytic films (A); and MS analysis of the liquid solution using the bilayer catalytic layer (B)

In order to determine the identity of products formed by the different coatings, CA at +0.75V (vs. Hg/HgO) in 0.1M KOH was conducted. The electrolyte was bubbled with continuous flow of methane gas. The products in the liquid and gaseous phases were collected after 2 hr of CA and were analyzed by GC and a mass spectrometer (MS). The results are shown in FIG. 12. FIG. 12A indicates that at the same conditions, methanol is produced only by the bilayer catalytic layer while no methanol can be observed for a coating comprised of only Ni(OH)$_2$. The product obtained by the bilayer was further verified by MS analysis as shown in FIG. 12B that displays the strongest peaks at m/z of 29, 31 and 32, which correspond to methanol.

Example 5

Figure 13:
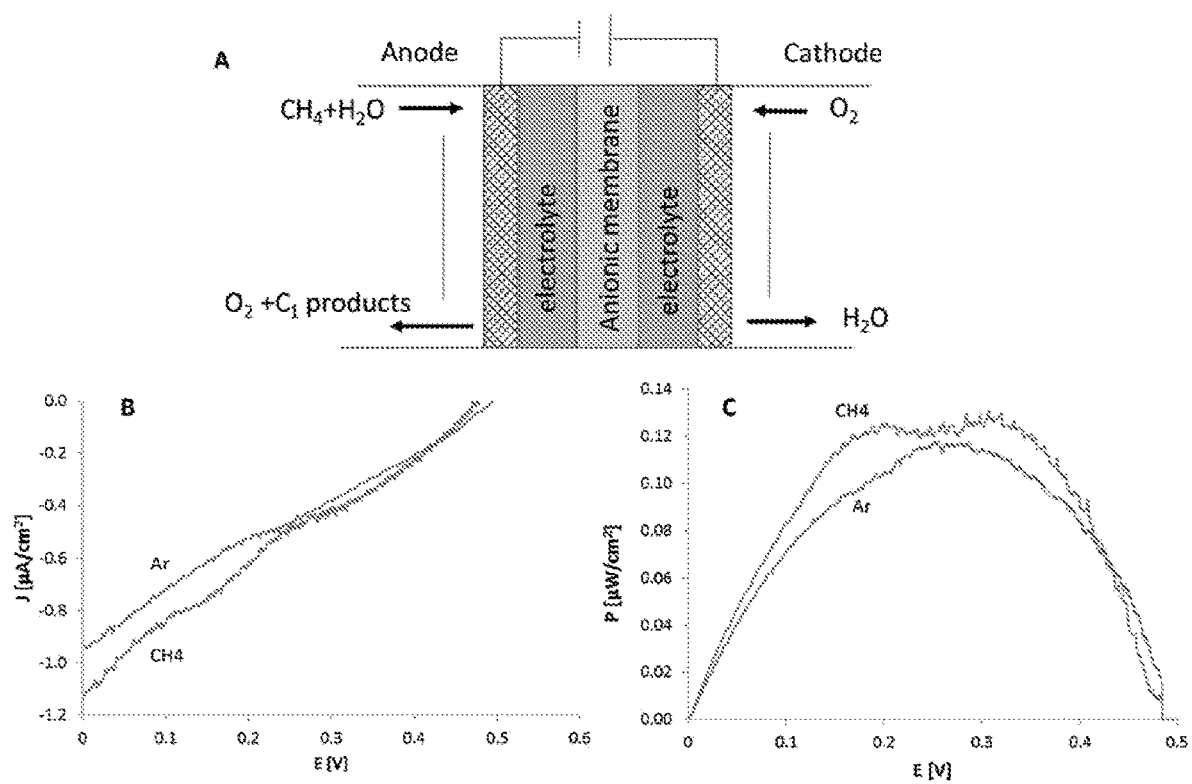
FIG. 13. shows (A) a schematic configuration of the tested fuel cell in accordance with the invention operating at room temperature; (B) linear sweep voltammograms at a scan rate of 5 mV/sec in 0.1M KOH (pH=13.0); and (C) power density vs. potential curves in the absence and presence of methane (flow rates of Ar and $CH_4$: ~75 cc/min).

Generation of Electricity with a Bilayer Catalytic Electrode in an Ambient Direct Methane Fuel Cell Methane and oxygen were used as fuel and oxidant, respectively, and supplied to a bilayer catalytic electrode and Pt mesh, used as anode and cathode, respectively, in a fuel cell operating at room temperature. The two electrodes were immersed in 0.1M KOH (pH=13) with an anionic exchange membrane (AMI-70015) serving as a separator for the two half cells, as schematically illustrated in FIG. 13A. Linear sweep voltammograms show higher current densities obtained in the presence of methane at the whole examined potential range, as compared to those obtained in its absence (FIG. 13B). The power vs. potential plots (FIG. 13C) show two separated peaks at ~0.15 V and 0.35 V with higher intensities in the presence of methane. This seems to indicate the occurrence of different pathways for the oxidation of methane and water, and possibly different products, obtained at different potentials at the electrode surface.

While the invention has been described using some specific examples, many modifications and variations are possible. It is therefore understood that the invention is not intended to be limited in any way, other than by the scope of the appended claims.

The invention claimed is:

1. An electrochemical cell for oxidizing methane (CH$_4$) to methanol (CH$_3$OH), comprising
   i) an electrode comprising nickel in an oxidized form selected from the group consisting of nickel hydroxide (Ni(OH)$_2$), nickel oxide hydroxide (NiOOH), and nickel foam;
   ii) an electrolyte comprising a base, such as a hydroxide or carbonate comprising solution, in contact with said electrode;
   iii) pressurized CH$_4$ source configured to deliver gaseous CH$_4$ to an electrode surface;
   iv) voltage source connected with said electrode; and
   v) means for reducing thermodynamic activity of CH$_3$OH near the surface of said electrode;
   wherein said cell produces CH$_3$OH when an electric current flows through the cell; and
   wherein said means for reducing thermodynamic activity of CH$_3$OH comprises a catalytic bilayer coating on the surface of said electrode.

2. The cell of claim 1, wherein said electrode comprises Ni(OH)$_2$/NiOOH grown on its surface from a precursor.

3. The cell of claim 1, wherein said electrode comprises Ni(OH)$_2$/NiOOH grown electrolytically on its surface from a nickel foam precursor.

4. The cell of claim 1, wherein said electrolyte comprises an aqueous base, such as KOH, NaOH, K$_2$CO$_3$, or Na$_2$CO$_3$, at a concentration of at least 1 mM.

5. The cell of claim 1, wherein said methane source comprises a pressurized CH$_4$ container and a dispersal means for delivering and dispersing the CH$_4$ gas on the interface between the electrode and the electrolyte or through an electrode porous structure (such as provided by carbon paper serving as a gas diffusion electrode).

6. The cell of claim 1, wherein said voltage source is configured to provide stable and high-output voltage between 0.5 and 1.5V.

7. The cell of claim 1, wherein said means for reducing thermodynamic activity of CH$_3$OH comprises a distillation unit.

8. The cell of claim 1, wherein said catalytic bilayer consists of a layer of an electropolymerized manganese porphyrin over a layer of electrochemically prepared Ni(OH)$_2$/NiOOH.

9. The cell of claim 1, wherein said catalytic bilayer consists of a layer of an electropolymerized iron or ruthenium porphyrin over a layer of electrochemically prepared Ni(OH)$_2$/NiOOH.

10. The cell of claim 1, wherein said electrode comprises a carbon paper substrate onto which said catalytic bilayer is formed, the first layer, in contact with said substrate, being electrochemically prepared Ni(OH)$_2$/NiOOH, and the second layer, in contact with said Ni(OH)$_2$/NiOOH, being electropolymerized manganese porphyrin, or iron or ruthenium porphyrin.

11. A fuel cell comprising the cell of claim 1 as a methanol source and for the generation of electricity at ambient conditions.

12. A process for producing methanol (CH$_3$OH) from methane (CH$_4$), comprising
   i) providing an electrochemical cell having an anode in contact with aqueous KOH and an inert cathode;
   ii) electrochemically creating a Ni(OH)$_2$/NiOOH layer on said anode, preferably on a nickel foam;
   iii) delivering and dispersing pressurized CH$_4$ from a pressurized source to the interface between said anode and said aqueous KOH;
   iv) applying direct voltage on said electrodes resulting in direct current in said cell, resulting in oxidation of said CH$_4$ to CH$_3$OH; and
   v) employing means for reducing thermodynamic activity of CH$_3$OH near a surface of said electrode, said means preventing oxidation of said CH$_3$OH;
   wherein said methanol is collected or further used in a fuel cell as an energy source; and
   wherein said anode is coated with a carbon paper substrate onto which a catalytic bilayer is formed consisting of a Ni(OH)$_2$/NiOOH layer in contact with said substrate and an electropolymerized manganese, or iron or ruthenium, porphyrin layer in contact with said Ni(OH)$_2$/NiOOH.

13. The process of claim 12, wherein said step v) includes heating the anode space and continual removal of the formed CH$_3$OH by distillation.

14. The process of claim 12, wherein said step iv) comprises applying voltage 0.75 V, and said step v) comprises heating the anode space to 80° C.

15. A process for producing methanol (CH$_3$OH) from methane (CH$_4$), comprising
   i) providing an electrochemical cell having an anode in contact with aqueous KOH and an inert cathode;
   ii) electrochemically creating a Ni(OH)$_2$/NiOOH layer on said anode, preferably on a nickel foam;
   iii) delivering and dispersing pressurized CH$_4$ from a pressurized source to the interface between said anode and said aqueous KOH;
   iv) applying direct voltage on said electrodes resulting in direct current in said cell, resulting in oxidation of said CH$_4$ to CH$_3$OH; and
   v) employing means for reducing thermodynamic activity of CH$_3$OH near a surface of said electrode, said means preventing oxidation of said CH$_3$OH;
   wherein said methanol is collected or further used in a fuel cell as an energy source; and (vi) electrochemically creating a manganese, or iron or ruthenium, porphyrin layer after said step of electrochemically creating the layer of $Ni(OH)_2/NiOOH$, forming a catalytic bilayer efficiently oxidizing $CH_4$ to $CH_3OH$ in said step iv) thereby also creating means for reducing thermodynamic activity of $CH_3OH$ near the surface of said electrode and precluding the oxidation of methanol.

\* \* \* \* \*